Patented May 16, 1939

2,158,278

UNITED STATES PATENT OFFICE 2,158,278

PROCESS FOR TREATING METAL

Mendel Donchi, Newark, N. J., assignor to Cooper & Cooper, Inc., Brooklyn, N. Y., a corporation of New York No Drawing. Application December 10, 1934, Serial No. 756,831

2 Claims. (Cl. 148—16)

This invention relates to processes for treating metal and is particularly directed to a method of hardening and blueing steel, for example, strip steel for razor blades.

An object of this invention is to provide a highly economical and simple process of the character described, which shall nevertheless be practical and efficient to a high degree.

Other objects of my invention will hereinafter appear in the following specification and the novel features thereof will be particularly pointed out in the appended claims.

In the manufacture of razor blades a strip of steel is guided through a long muffle made of heat resisting material and extending through a long furnace which is heated by burners. For example, in the furnace employed in carrying out the process herein described the temperature of the furnace may vary from about 1350 deg. at the intake end to about 1550 deg. at the exit end of the furnace, so that the strip may thus be progressively heated to a temperature above its critical point. The strip is preferably chilled upon emerging from the furnace. To oxidize the strip in such a way as to produce a blue surface thereon while the strip is going through the process of tempering and hardening, I treat the strip with air impregnated with methyl alcohol vapors, as hereinafter more fully described.

In carrying out my process, air under pressure is passed through a vessel containing pure methyl alcohol, the vessel being immersed in hot water, so as to facilitate evaporation of the alcohol. The air is then conducted into the muffle at the intake end, so as to contact the steel strip as the latter is admitted into the muffle and passes through the same. Methyl alcohol, having a low boiling point, evaporates readily even at room temperature. When air is passed therethrough, the evaporation of the alcohol is accelerated, although not to the rate of evaporation of the methyl alcohol when boiled. The air passing out of the methyl alcohol vessel carries with it the alcohol vapors and enters the muffle simultaneously with the strip of steel and thus acts upon the steel while the strip is being conveyed through the muffle and subjected to the heat of the furnace. The strip so treated, emerges from the muffle with a lustrous blue coating.

It is desirable to maintain the alcohol, as far as possible, at its original strength and, therefore, it is preferable to extract any moisture from the air before it is passed through the alcohol. Moreover, I have found that better results are obtained when the air impregnated with alcohol vapors which enters the muffle is moisture free. I, therefore, preferably add calcium chloride or other suitable water absorbent to the methyl alcohol, or pass the air over powdered calcium chloride before passing the air through the alcohol, so that the air which enters the alcohol, as well as the impregnated air which passes into the muffle, is free substantially from moisture.

Although methyl alcohol has been found to give good results and to be easy to use because it evaporates easily, it will be understood that other alcohols, the homologues of methyl alcohol, such, for example, as methanol, may be employed in carrying out my process.

The exact chemical reactions, or the interaction between the alcohol saturated air and the steel cannot be stated with certainty. Direct action of air upon the steel does not produce the blue oxide and I have found that the methyl alcohol vapors, when added to the air, do produce the desired results. Very likely, what occurs is that the methyl alcohol is first converted into aldehyde, or acetone and the latter, in turn, acts directly upon the steel to produce the desired surface oxidation; namely, to form a coating of $Fe_3O_4$ on the steel.

While I have described my improved process as being particularly applicable to blueing strip steel in the manufacture of razor blades, it will be understood that steel for other purposes may be blued and hardened with my improved process.

It will thus be seen that I have provided a process in which the several objects of this invention are achieved and which is adapted to meet the conditions of practical use.

As various possible embodiments might be made of the above invention, and as various changes might be made in the embodiment above set forth, it is to be understood that all matter herein set forth is to be interpreted as illustrative and not in a limiting sense.

Having thus described my invention, I claim as new and desire to secure by Letters Patent:

1. A method of the character described, consisting in passing air through alcohol, treating the air with a moisture absorbent, passing a strip of steel through the muffle of a furnace, and passing the air mixed with the alcohol vapors into the muffle.

2. A method of the character described consisting in passing moisture free air through alcohol to saturate the air with said alcohol, passing a strip of steel through the muffle of a furnace and passing the alcohol saturated air into the muffle.

MENDEL DONCHI.